Figure 3:
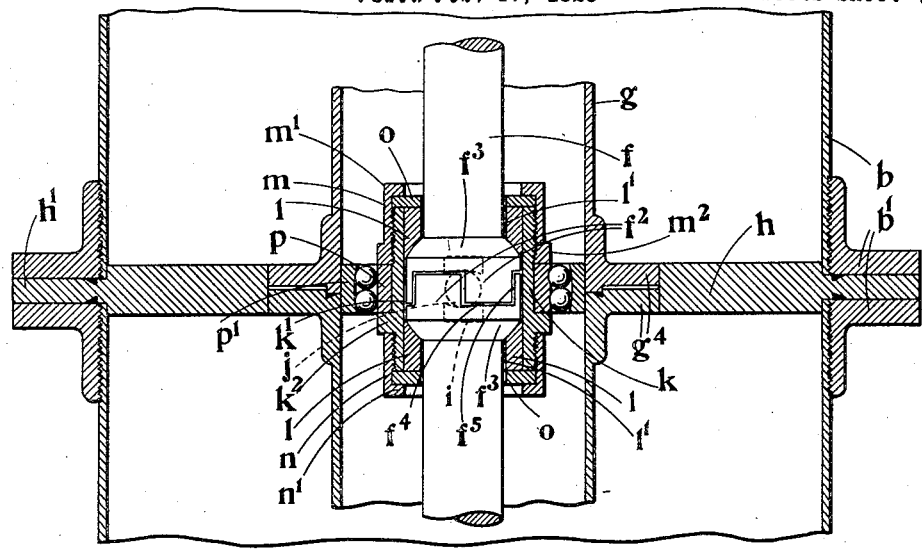

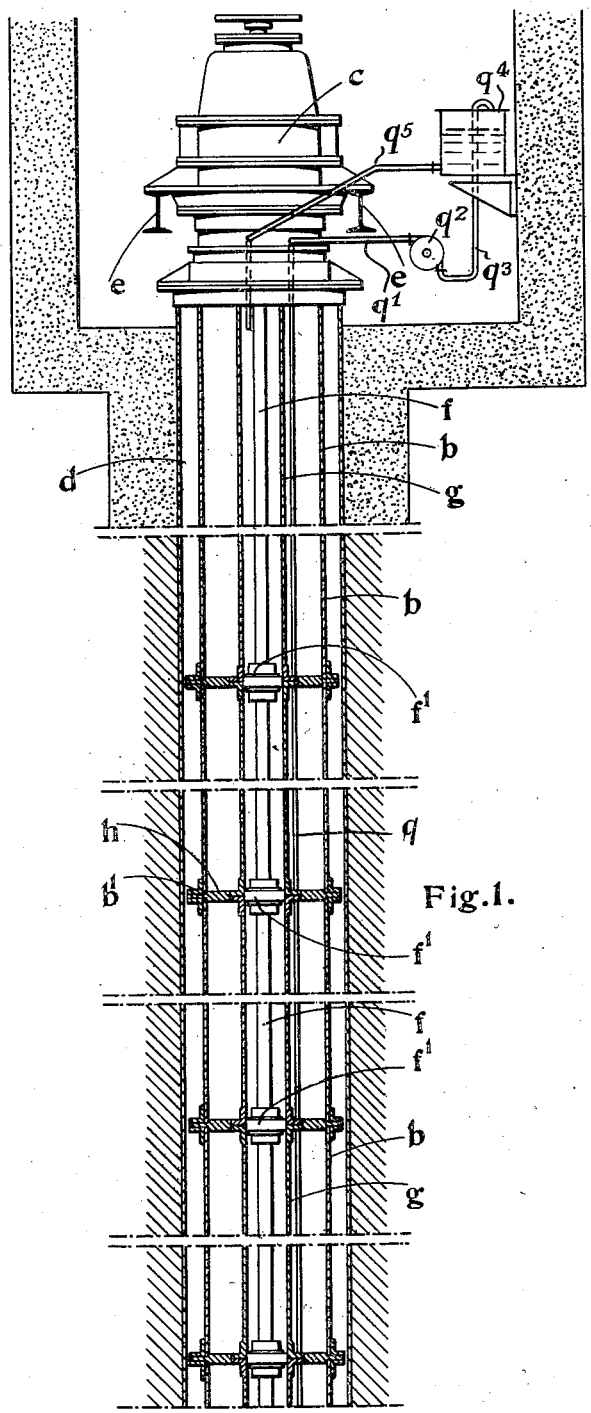
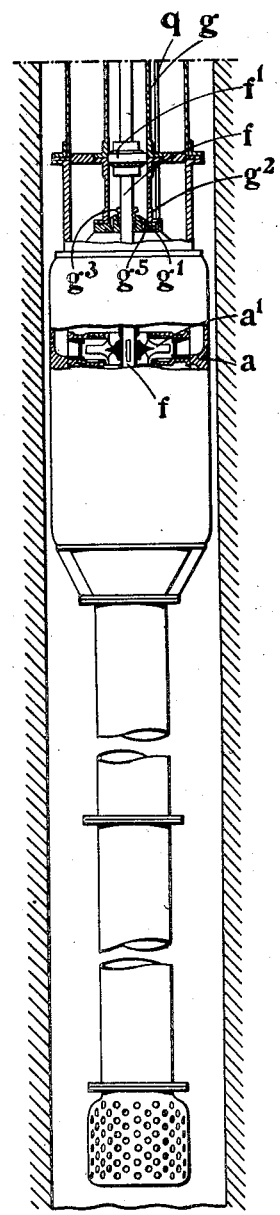
Fig.1.
Fig.2.

Aug. 23, 1927.

A. C. POTTER 1,639,703

DEEP WELL PUMPING INSTALLATION AND THE LIKE

Filed Feb. 19, 1925     2 Sheets-Sheet 2

Inventor:
A. C. Potter
by
W. E. Swan
Attorney.

Patented Aug. 23, 1927.

1,639,703

UNITED STATES PATENT OFFICE.

ARTHUR CRAWLEY POTTER, OF GRANTHAM, ENGLAND.

DEEP-WELL-PUMPING INSTALLATION AND THE LIKE.

Application filed February 19, 1925, Serial No. 10,378, and in Great Britain February 26, 1924.

This invention relates to deep well pumping installations and the like, of the kind in which a centrifugal or other rotary pump or a plurality of such pumps is or are arranged to operate within a bore hole or other conduit through which the liquid is pumped.

In known pumping installations of the kind referred to, the stationary part or parts of a centrifugal or other rotary pump is or are suspended within the bore hole, well or shaft by means of a cylindrical casing or tube forming the bore hole delivery pipe which depends from a head box supported over the mouth of the bore hole, well or shaft. The rotatable parts of the pump are suspended from or supported by a thrust box mounted upon the head box, pump casing, or other convenient support by means of the pump driving shaft upon which they are mounted, and which is disposed concentrically within the cylindrical casing or tube and is supported therein at intervals by bearings mounted between the connected lengths or sections of which the cylindrical casing or tube is constituted.

In such installations the pump driving shaft is usually immersed in the liquid and consequently considerable friction loss results having regard to the length of the shaft so immersed.

The invention has among its objects to provide simple and effective means whereby this friction loss may be substantially reduced, and whereby water and sand or other solid materials held in suspension therein may be excluded from the bearings supporting the pump driving shaft, to provide means for ensuring the effective lubrication of the lateral supporting bearings of the driving shaft, and to provide an improved construction of the cylindrical casing or tube forming the bore hole delivery pipe.

According to the invention a stationary sleeve provided within the cylindrical casing or tube to surround the driving shaft is formed of connected sections or lengths corresponding substantially in length to the sections or lengths of the cylindrical casing or tube, but independent thereof, and is supported centrally within the cylindrical casing or tube by means of spider or other suitable fittings provided advantageously at the junctions between adjacent sections of the cylindrical casing or tube. It will be understood that the sleeve is adapted to surround the pump driving shaft for the whole or the greater part of its exposed length and that suitable means are provided whereby water and sand or other solid material held in suspension therein are excluded from the interior of the sleeve and thus from contact with the shaft and the bearings supporting the shaft. Such means may advantageously comprise a closure member or fitting adapted to be bolted or otherwise secured to the lower end of the stationary sleeve, the closure member or fitting having a central bore and stuffing box for the passage of the pump driving shaft.

The invention comprises the constructional features hereinafter described.

The invention is hereinafter described by way of example with reference to the accompanying drawings in which—

Figure 4:
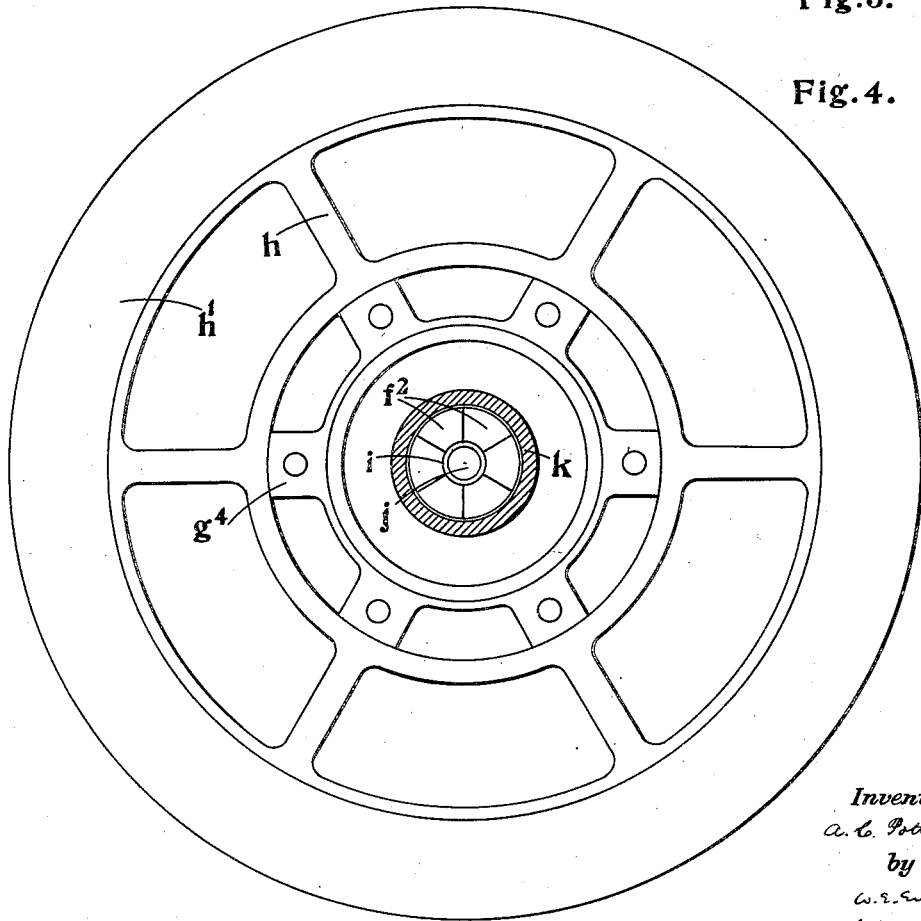

Figure 1 is a sectional elevation showing the head and the upper part of a deep well pumping installation according to the invention, Figure 2 is a similar view showing the lower part of the installation, Figure 3 is a part sectional elevation illustrating a suitable form of connection between adjacent sections of the cylindrical casing or tube, the sleeve and the pump driving shaft and also the lateral supporting bearing for the latter, and Figure 4 is a part sectional plan view corresponding to Figure 3 but with the upper sections and shaft supporting bearing omitted.

In carrying the invention into effect and with reference to the accompanying drawings, the stationary parts $a$ of a turbine or other rotary pump are mounted upon a cylindrical casing or tube $b$ advantageously provided in sections of standard length and depending from a head box $c$ which is supported at the mouth of the bore hole $d$ by joists $e$. The rotary parts $a^1$ of the pump are mounted upon a driving shaft $f$ which is suspended concentrically within the stationary parts and is supported at its upper end by a thrust bearing mounted upon the head box $c$. The driving shaft $f$ is guided by suitable lateral supporting bearings $f^1$ in determined positions at the junctions of adjacent sections of the cylindrical casing or tube $b$, and the shaft is driven by a prime mover either direct or through suitable gearing at its upper end. A stationary sleeve $g$ is adapted concentrically to surround the pump driving shaft $f$ and at its upper end is supported from the head box $c$ or other convenient support in any suitable manner. The stationary sleeve $g$ is advantageously provided in sections corresponding substantially in length to the sections of the cylindrical casing or tube $b$, the sections being connected together so as to form a water-tight joint. The stationary sleeve $g$ may be provided to extend the whole or substantially the whole of the exposed length of the pump driving shaft $f$ in position short of the pump. The lower end of the stationary sleeve $g$ may be provided with a closure member or fitting $g^1$ which may advantageously be secured to a flange $g^2$ at the lower end of the stationary sleeve and the closure member or fitting may be provided with a central bore and stuffing box $g^3$ for the passage of the pump driving shaft $f$.

The sections of the cylindrical casing or tube $b$ forming the delivery pipe may be connected together by oppositely disposed circular flanges $b^1$, the oppositely disposed faces of which are adapted to grip between them and to support a spider or other fitting $h$ which serves for the lateral support of the sleeve $g$. The sections of the driving shaft $f$, stationary sleeve $g$ and the cylindrical casing or tube $b$ may be co-extensive and thus the respective parts by which the sections are connected together may be disposed substantially in the same horizontal line.

The respective sections of the pump driving shaft may at their ends be provided with clutch members $f^2$ by means of which the adjacent sections of the shaft are engaged one with the other so as to transmit the drive to the pump.

The respective clutch members may be recessed centrally for the reception of bearing blocks $i$ adapted for the reception between them of a steel ball $j$ which determines the extent of engagement of the clutch members and thus ensures clearance spaces $f^4$ between the corresponding parts of the respective clutch members, clearance spaces $f^5$ being also provided between the lateral faces of the engaging parts of the clutch members.

The engaged clutch members of adjacent sections are surrounded by a cylindrical sleeve $k$, the internal diameter of which is sufficient to provide an annular clearance space $k^1$ around the engaged clutch members. Cylindrical split rings or sleeves $l$, provided to fit within the sleeve $k$, are formed with spherical bearing surfaces struck from the centre of the ball $j$ which bearing surfaces are adapted to engage corresponding spherical bearing surfaces $f^3$ provided upon the respective clutch members. Annular clearance spaces $l^1$ are provided between the split rings or sleeve $l$ and the respective sections of the driving shaft $f$ and the respective split rings or sleeves $l$ are adapted to be drawn together and held, for example, by means of internally screw-threaded cylindrical members $m$, $n$ engaging with external screw threads upon the cylindrical sleeve $k$, split spacing rings $o$ being advantageously provided to be clamped between the ends of the split rings or sleeves $l$ and internally extending flanges $m^1$, $n^1$, on the cylindrical members $m$, $n$.

It will be understood that in the use of the spherical bearing surfaces aforesaid and the provision of the clearance spaces $k^1$, $l^1$, $f^4$ and $f^5$, slight relative angular movement of the sections of the pump driving shaft $f$, such as might be required owing to deviations in the bore hole is permitted and thus strains in the shaft are avoided.

The inner race $p$ of a ball bearing is advantageously clamped between an external flange $k^2$ on the cylindrical sleeve $k$ and the enlarged end $m^2$ of the cylindrical member $m$ and the outer race $p^1$ is adapted to be mounted within the stationary sleeve $g$ in which it is a driving fit whereby the pump driving shaft is supported centrally therein.

The adjacent sections of the stationary sleeve $g$ may be secured together by means of external flanges or spiders $g^4$ which are adapted to fit within a cylindrical bore in the spider or other fitting $h$ whereby the stationary sleeve is supported centrally within the cylindrical casing or tube $b$. The spider or other fitting $h$ is advantageously provided with an external flange $h^1$ which is clamped between the adjacent flanges $b^1$ of the respective sections of the cylindrical casing or tube $b$.

It will be understood that the means for the connection together of the respective adjacent sections of the cylindrical casing or tube $b$, the stationary sleeve $g$ and the pump driving shaft $f$, may be modified in various ways.

By the means hereinbefore described the concentric disposition and support of the driving spindle with reference to the stationary sleeve and of the stationary sleeve with reference to the surrounding cylindrical casing or tube is ensured at positions between the respective co-extensive sections.

For ensuring the lubrication of the lateral supporting bearings of the pump driving shaft $f$ an oil supply pipe $q^5$ may be provided to pass through the head box into the upper end of the stationary sleeve $g$ whereby lubricating oil may be supplied, from a reservoir $q^4$ to which the oil supply pipe $q^5$ is connected, to all the lateral supporting bearings of the driving shaft $f$ in succession, the oil accumulating above each of the bearings and dripping successively from one bearing to the next beneath.

A return or discharge pipe $q$ for oil or for oil and water may be connected to a passage $g^5$ in the closure member or fitting $g^1$ which passage communicates with the interior of the stationary sleeve $g$ and the return or discharge pipe $q$ may pass upwardly through the bore hole delivery pipe in a position adjacent the exterior of the stationary sleeve $g$ and may be supported laterally by passing through holes provided in the flanges or spiders $q^4$ of the series of connected sections of the stationary sleeve $g$.

Alternatively, the return or discharge pipe $q$ may be mounted near the internal face of the stationary sleeve $g$ and may pass through the rings, bearings or other fittings by which the pump driving shaft is supported centrally within the sleeve.

It will be understood that the lubricating oil accumulating at the lower end of the stationary sleeve $g$ may pass up the discharge pipe $q$ under pressure of air within the sleeve $g$ or by means of a pump $q^2$ the inlet of which is connected to the upper end of the discharge pipe $q$ by means of a pipe $q^1$ and the outlet of which may discharge into the oil reservoir $q^4$ through a pipe $q^3$ whereby a continuous circulation of the oil may be effected.

In a modified construction the sections of the stationary sleeve may advantageously be formed of substantially the same standard length as the sections of the cylindrical casing or tube forming the discharge pipe and may be formed integrally therewith or in integral segmental sections by means of radially disposed connecting arms whereby complete or sectional units are formed adapted for ready connection and disconnection.

It will be understood that the invention is not limited to the details of construction hereinbefore described, for example, the means for connecting adjacent sections of the stationary sleeve may be otherwise modified without departing from the invention.

It will be understood, also, that the means hereinbefore described for permitting angular deviation of the adjacent sections of the pump driving shaft are applicable to installations in which a stationary sleeve is not provided and in which the said shaft is accessible to water. The shaft in such constructions may be supported from the cylindrical casing or tube by bearings of lignum vitæ or of any other suitable material or construction.

I claim:

1. A deep well pumping apparatus comprising a tube serving as a bore hole delivery pipe, a rotary pump mounted upon the lower end of the said tube, a pump driving shaft disposed concentrically within the said tube and provided in sections of determined length, and a joint between the respective adjacent sections of the pump driving shaft for their connection to permit slight angular movement of adjacent sections with respect to each other, substantially as hereinbefore described.

2. A deep well pumping apparatus comprising a tube provided in sections of determined length, a rotary pump mounted upon the lower end of the said tube, a pump driving shaft disposed concentrically within the said tube and provided in sections of a length corresponding to that of the respective sections of the said tube, a stationary sleeve surroundng the pump driving shaft and provided in sections of a length corresponding to that of the respective sections of the said tube, a joint between the respective sections of the said pump driving shaft for their connection to permit slight angular movement of adjacent sections with respect to each other, substantially as hereinbefore described.

3. A deep well pumping apparatus comprising a tube serving as a bore hole delivery pipe, a rotary pump mounted upon the lower end of the said tube, a pump driving shaft disposed concentrically within the said tube and provided in sections of determined length, clutch members mounted upon the adjacent oppositely disposed ends of the said sections to engage loosely one with the other and to permit of relative angular movement of the said sections with respect to each other, and means for the support of the said engaging clutch members, substantially as hereinbefore described.

4. A deep well pumping apparatus comprising a tube serving as a bore hole delivery pipe, a rotary pump mounted upon the lower end of the said tube, a pump driving shaft disposed concentrically within the said tube and provided in sections of determined length, clutch members mounted upon the adjacent oppositely disposed ends of the said sections to engage loosely one with the other to permit of relative angular movement of the said sections with respect to each other, means for the support of the said engaging clutch members, and means disposed between the said engaging clutch members to maintain them in determined positions with clearance between, substantially as hereinbefore described.

5. A deep well pumping apparatus comprising a tube serving as a bore hole delivery pipe, a rotary pump mounted upon the lower end of the said tube, a pump driving shaft disposed concentrically within the said tube and provided in sections of determined length, clutch members mounted upon the adjacent oppositely disposed ends of the said sections to engage loosely one with the other to permit of relative angular movement of the said sections with respect to each other, means for the support of the said engaging clutch members comprising a sleeve rotating with the engaging clutch members and a ball bearing between the said rotating sleeve and said stationary sleeve, and means disposed between the said engaging clutch members to maintain them in the determined positions with clearance between them, substantially as hereinbefore described.

6. A deep well pumping apparatus comprising a tube serving as a bore hole delivery pipe, a rotary pump mounted upon the lower end of the said tube, a pump driving shaft disposed concentrically with the said tube and provided in sections of determined length, clutch members mounted upon the adjacent oppositely disposed ends of the said sections, the said clutch members having their rear parts formed of spherical shape, said clutch members engaging loosely one with the other to permit of relative angular movement of the said sections with respect to each other, and means for holding the said clutch members and for the support of the pump driving shaft comprising a sleeve and split rings having spherical faces for contact with the spherical faces of the respective clutch members, substantially as hereinbefore described.

7. A deep well pumping apparatus comprising a tube serving as a bore hole delivery pipe, a rotary pump mounted upon the lower end of the said tube, a pump driving shaft disposed concentrically with the said tube and provided in sections of determined length, clutch members mounted upon the adjacent oppositely disposed ends of the said sections, the said clutch members having their rear parts formed of spherical shape, said clutch members engaging loosely one with the other to permit of relative angular movement of the said sections with respect to each other, means for holding the said clutch members and for the support of the pump driving shaft comprising a sleeve and split rings having spherical faces for contact with the spherical faces of the respective clutch members, and means disposed between the said engaging clutch members to maintain them in determined positions with clearance between comprising a ball set within the recesses of the oppositely disposed clutch members and whose centre is the centre of the spherical faces of the corresponding clutch members, substantially as hereinbefore described.

ARTHUR CRAWLEY POTTER.